FIG. I

INVENTORS:
WILLBURT W. SCHROEDTER
EDWARD L. KOCHEY, JR.

BY

AGENT

United States Patent Office 3,194,218
Patented July 13, 1965

3,194,218
APPARATUS AND METHOD FOR STARTING
FORCED FLOW ONCE-THROUGH STEAM
GENERATING POWER PLANT
Willburt W. Schroedter, West Hartford, and Edward L. Kochey, Jr., Colebrook, Conn., assignors to Combustion Engineering, Inc., Windsor, Conn., a corporation of Delaware
Filed Mar. 25, 1963, Ser. No. 267,514
3 Claims. (Cl. 122—406)

The invention relates in general to a forced flow once-through vapor generating power plant and more particularly to an improved apparatus and method for starting operation of the vapor generator and turbine associated therewith when operating at high vapor pressures such as at or above critical pressure.

In starting forced flow once-through vapor generators it is important to use care in controlling the way in which the heat absorbing sections of the unit exposed to high temperatures are heated to avoid damage resulting from extreme differential thermal stresses. It is also important to avoid deposition of solids within these portions of the unit to prevent tube failure due to overheating resulting from the presence of the deposited solids. Furthermore it is most desirable when starting large vapor generating units of this type to reduce the time required for startup within safe limits of procedure. In addition it is of great economic importance to reduce the cost of the startup equipment with this equipment being employed only during startup and shutdown of the vapor generator and being idle during normal full load operation of the unit.

It is accordingly an object of the present invention to provide a startup procedure for a once-through forced flow steam generator in which during the startup operation complete protection is provided for the furnace tubes against overheating without requiring large and continuous through flow quantities leaving the generator with only a small portion thereof being utilized during startup for turbine warming and rolling. Accordingly and quite contrary to presently known startup methods the present invention permits the expenditure of a relatively small original outlay for startup and shutdown equipment.

Other objects and advantages will become apparent as the description of an illustrative embodiment of the invention proceeds. The novel features which are considered characteristic of the invention are set forth with particularity in the appended claims. These claims as well as the following description of the invention will best be understood when read in conjunction with the accompanying drawing in which:

FIG. 1 is a representation of a vapor power plant system in the form of a flow diagram incorporating the inventive features.

FIG. 2 shows a top curve indicating the total fluid or feedwater flow during the startup period. It also shows curves and cross-hatched areas indicating the relative quantities of fluid passing through the individual valves at their specific locations and through the turbine when operating the boiler up to 30% of maximum capacity. FIG. 2 further indicates the sequence of operations such as the opening and closing of valves and the starting and synchronizing of the turbine.

The vapor generating power plant

Figure 1:
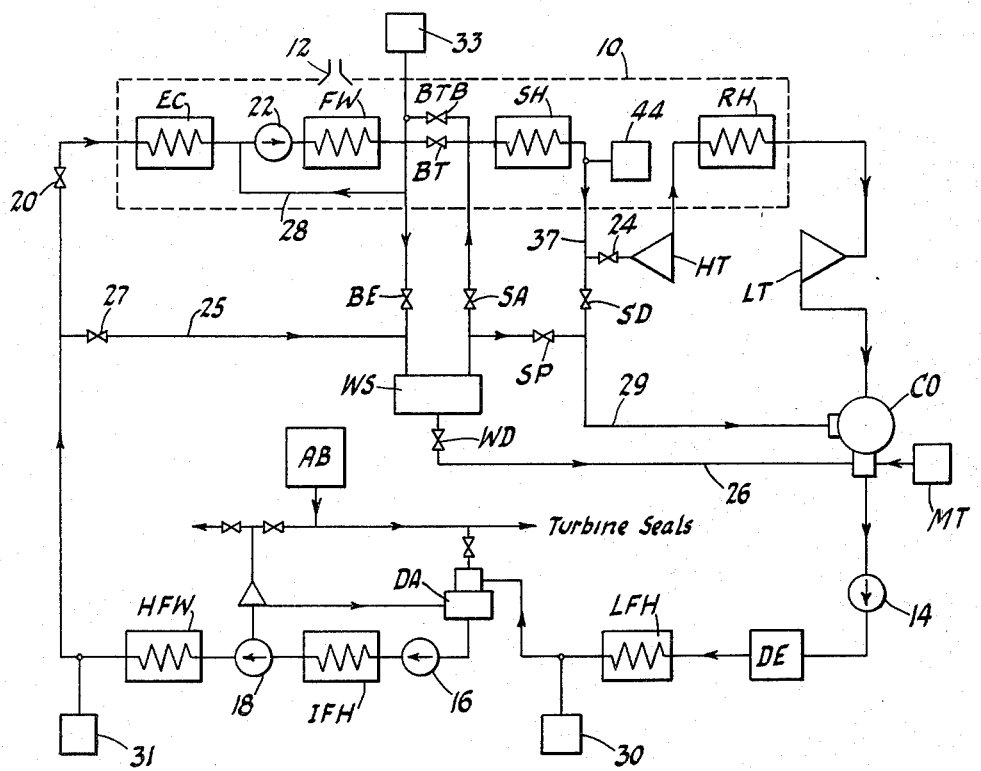

Turning now to FIG. 1, numeral 10 represents a forced once-through flow vapor generator, including a furnace chamber, diagrammatically defined by a broken line. The vapor generator comprises a fluid heating portion or economizer EC, a vapor generating portion or furnace wall tubes FW, a vapor heating portion or superheater SH and a vapor reheating portion or reheater RH. Air and fuel for burning is introduced into the furnace chamber 10 by way of burners 12 with the combustion gases flowing over and radiating heat to the furnace wall tubes FW carrying heat absorbing fluid, the superheater SH, the reheater RH and the economizer EC. Other heat absorbing surfaces may be provided such as an air heater, not shown.

Working fluid of accepted purity originating at a suitable source such as makeup tank MT is delivered to the hotwell of condenser CO, hence by way of condenser pump 14, a demineralizer DE, and low pressure fluid heater LFH to deaerator DA. A booster pump 16 and feed pump 18 is organized to deliver the working fluid through an intermediate pressure heater IFH and a high pressure fluid heater HFH by way of feed valve 20 to economizer EC. From economizer EC the working fluid flows via recirculating pump 22 through the furnace wall tubes FW, boiler throttle and stop valve BT and BTB into superheater SH, and thence via turbine control valve 24 into a high pressure turbine generator HT. Having given up a large portion of its heat energy the working fluid or vapor passes to and is reheated in reheater RH and thence piped to low pressure turbine generator LT and condenser CO for final extraction of the heat energy contained therein, with the circulation cycle being completed by collection of the condensate in the hotwell of condenser CO.

Having thus described in broad outline the normal operation flow sequence of the once-through forced flow vapor generator depicted in FIG. 1, the novel startup operation of the boiler and turbine generator as disclosed in accordance with the invention will now be described.

The inventive startup operation

Various methods have been employed in the past in starting up a conventional once-through flow vapor generator. Two such methods are disclosed in U.S. Patent 2,989,038 issued to O. Schwarz and U.S. Patent 3,019,774 issued to H. Beyerlein. All of these methods have one requirement in common. In order to insure a minimum safe velocity of the working fluid through the furnace wall circuits it is necessary during startup operation that a through-flow quantity of at least 30% of maximum flow requirement must be maintained to safe-guard the furnace wall tubes against burn out. During startup operation as practiced in these conventional methods the heat absorbed and carried out of the furnace wall section by the working fluid cannot all initially be utilized in the superheater and turbine. Consequently a large portion thereof must be disposed by way of a superheater and turbine bypass with a large portion of the heat energy in the fluid being lost such as through the condenser. Furthermore the equipment that is being provided for initial startup operation of the boiler must be dimensioned to accommodate these large bypass flow quantities of the working fluid. Ths results in a substantial capital outlay for equipment that is only in use during the startup or shut down operation of the unit.

In contrast thereto the present invention provides and discloses a startup apparatus and procedure requiring startup equipment designed only to accommodate a relatively small through-flow quantity such, as for example, 5% of maximum flow requirement for the purpose of initially warming and rolling the turbine, and only approximately 10% of maximum flow requirement to synchronize the turbine. At approximtaely 10% of maximum flow the superheater and turbine bypass equipment can completely be shut off and taken out of operation. Startup equipment accordingly need only be provided of a size which is approximately ⅓ of the size needed in conventional startup procedure.

The herein disclosed inventive startup method is preferably divided into three major phases. The first phase is concerned with the cleanup of the so-called preboiler which includes equipment that is passed through by the working fluid from the condenser CO to the feed valve 20. This preboiler cleanup phase is described in detail in the co-pending application Serial No. 267,515 filed on even date in the name of Hilary A. Grabowski, and entitled "Method and Apparatus for Preboiler Cleanup of a Once-Through Steam Generator" and commonly assigned with instant application.

The second phase concerns the cleanup of the boiler portion which includes economizer and furnace wall tubes, or in other words the equipment through which the working fluid passes from the feedwater valve 20 to the boiler throttling and stop valves BTB and BT. This phase of the startup procedure is disclosed in detail in the co-pending application Serial No. 267,588 filed on even date in the name of Hilary A. Grabowski, and entitled "Boiler Cleanup Method for Combined Circulation Steam Generator" and commonly assigned with instant application.

The third phase of the novel startup method herein disclosed is concerned with the superheater cleanup and the warming, rolling and synchronizing of the turbine generator.

A criterion of the purity of the working fluid as it passes through the preboiler equipment and furnace walls lies in the concentration of impurities such as copper and iron carried in the working fluid as it leaves the furnace wall tubes FW. Such determination is made at the furnace wall outlet or other convenient point by chemical analysis equipment 33. Experience has shown that when the iron and the copper concentration leaving the furnace walls each fall below 20 p.p.b. (parts per billion), the working fluid is of acceptable purity.

*The preboiler cleanup*

Turning now to FIG. 1, auxiliary boiler AB is in operation providing steam for turbine seals and blanketing of the de-aerator DA and for the initial operation of the feed pump. Turbine LT is on turning gear with conventional vacuum pumps (not shown) in operation maintaining a vacuum to minimize absorption of air by the feedwater entering the low pressure heat cycle and to maintain the feedwater below the maximum limitations imposed by the demineralizer. With pumps 14 and 16 in operation and feed valve 20 and valves BE, SA and SP closed the preboiler system is filled with demineralized feedwater from the auxiliary boiler AB via makeup tank MT and hotwell of condenser CO. Valves 27 and valve WD are gradually opened to establish recirculation through the preboiler system and separator WS to the condenser hotwell by way of conduits 25 and 26. All the feedwater leaving the hotwell is passed through the demineralizer DE and deaerator DA. Chemical check points 30 and 31 to determine the concentration in the feedwater are in operation at the outlet of the feedwater heater LFH and HFH. When the concentration of iron and copper in the water, as measured at point 31 leaving the high pressure heater HFH, each drops to approximately 20 p.p.b. the cleanup operation of the preboiler is completed.

*The boiler cleanup*

The second phase of the startup operation can now commence by slowly opening the feed valve 20 to fill and vent the boiler with valve BT and valve BTB closed. To discontinue recirculation through the preboiler cycle valve 27 is now gradually closed. When the boiler (economizer EC and furnace wall tubes FW) is filled and vented valve BE is initially set to open at a pressure of approximately 1000 p.s.i.g.

During the startup operation this pressure will consecutively be set at higher values to maintain the pressure in the unit well above the saturation point of the fluid as the temperature is increased. This pressure will eventually reach 3500 p.s.i.g., the maximum operating pressure in the system presently being described.

The boiler feed pumps 18 are now started with auxiliary steam, and a minimum flow of approximately 5% of maximum capacity requirement is established through the feedwater valve 20 and through the economizer and furnace walls while the pressure is initially being controlled at 1000 p.s.i.g. by valve BE. At this time recirculation pump 22 is started to maintain a minimum safe velocity in the furnace tubes.

This velocity is usually held at 3 f.p.s. and would correspond to a minimum flow of 30% of maximum flow requirement when starting up a conventional once-through flow steam generator without water recirculation.

Figure 2:
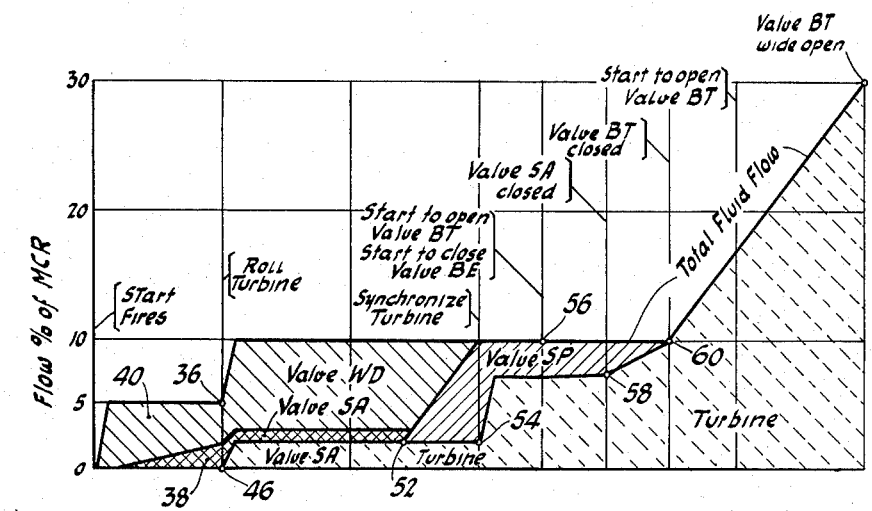
Figure 3:
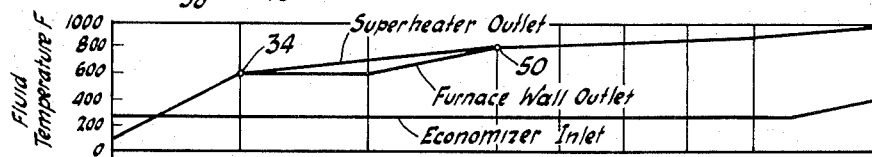
FIG. 3 shows a set of curves indicating the rise in fluid temperature at the economizer inlet, the furnace wall outlet and the superheater outlet during the startup operation from zero capacity to 30% of maximum capacity.
Figure 5:
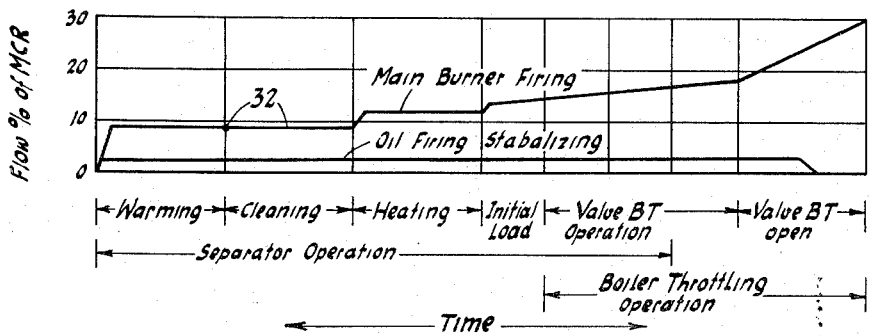
FIG. 5 shows a curve indicating the fuel firing rate in percentage of maximum capacity requirement for a range extending between zero and 30% of maximum capacity.

Lighting off of the burners 12 can now take place and with fuel input increasing as indicated at 32 in FIG. 5 from zero to approximately 8% of maximum capacity requirement, the temperature of the working fluid at the furnace wall outlet gradually increases to 600° F. as shown at 34, FIG. 3. During this period a recirculation flow of approximately 50% of maximum capacity requirement is preferably maintained in the furnace wall tubes FW and through circulating conduit 28. However only about 5% of maximum capacity requirement as indicated at point 36 of FIG. 2, is initially being permitted to pass out of valve BE during the warm up period, and flow into steam and water separator or flash tank WS. Since the pressure downstream of valve BE is being less than the pressure upstream thereof some of the water will begin to flash into steam. With valve SP closed this steam will be available by way of valve SA and superheater SH to flow to and to warm up the main steam lines 37. Since the turbine valves 24 are closed the warm up steam will flow to the condenser CO by way of valve SD, as indicated in FIG. 2 by the cross-hatched area designated 38. At the same time the water separated from the steam at separator WS is conducted out of the separator by way of valve WD and conduit 26 to the condenser and demineralizer for cleanup, as shown by the area designated 40 in FIG. 2. As soon as the concentration of solids falls below 20 p.p.b. as measured at 33 the boiler cleanup phase is completed.

A chemical check point 44 is in operation at the superheater outlet for determining the solid concentration in the steam. As soon as this concentration falls below an acceptable limit the steam turbine of the boiler feed valve 20 can then be operated with steam from superheater SH instead of auxiliary steam.

*Rolling and synchronizing the turbine*

Figure 4:
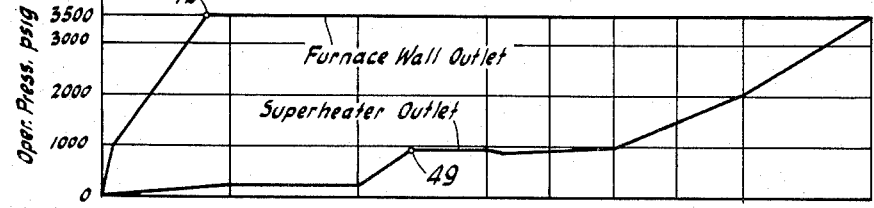
FIG. 4 shows a set of curves indicating the rise in pressure at the furnace wall outlet and the superheater outlet during startup operation covering a range from zero to 30% of maximum capacity.

With a maximum pressure of 3500 p.s.i.g. thus maintained in the boiler upstream of valve BE and with a fluid temperature maintained at 600° F., and with low pressure steam flowing through the superheater SH for the cooling thereof and for warming up the main steam line 37 leading to the turbine, the time has come for rolling the turbine LT with low pressure steam from separator WS as indicated at 46 in FIG. 2. During this time, by increasing the firing rate, the temperature as well as the pressure of the steam leaving the superheater SH is raised until the pressure reaches approximately 1000 p.s.i.g. and the temperature reaches 800° F., as indicated at 48 in FIG. 4 and at 50 in FIG. 3. Also during this time valve SD is closed and valve SP is opened for the purpose of passing the steam that is not being used for rolling the turbine, to the condenser. This is indicated at point 52 of FIG. 2.

With a through-flow of only 10% of maximum capacity requirement being maintained, and with the concentration of solids below an acceptable limit of 20 p.p.b. being measured at check point 44, rolling of the turbine is followed by the synchronization thereof. This is indicated at point 54 of FIG. 2, and is accompanied by a decrease of flow through valve SP and an increase of flow through valve SA and superheater SH. It is also followed by a gradual shifting of the control of flow from valve BE to valve BTB. This valve, in contrast to valve BT, is specifically designed for large pressure drops with relatively small flow quantities. Accordingly as indicated at point 56 of FIG. 2, valve BE is being closed while valve BTB is being opened. And at point 58 valve SA also is being closed, and together with valve BE is finally closed at point 60, with the 10% flow to superheater SH and turbine LT now passing through valve BTB.

At this time valve BT starts to open with the flow and the pressure of the steam to the turbine now increasing sharply until at a flow of 30% of maximum capacity requirement valve BT is completely opened and the pressure upstream and downstream thereof substantially equalized. This is indicated at point 62 of FIG. 2 and at point 64 of FIG. 4. The startup operation of the steam generating power plant is thus completed and the unit can now go on full load.

Summary

In view of the above, it will be apparent that the herein disclosed method and apparatus for starting a once-through forced flow steam generating power plant offers important advantages which include the following:

(1) The cleanup of the preboiler and of the boiler takes place in two distinct and separate operations, insuring that none of the impurities removed from the preboiler system can enter and hide out in the boiler system;

(2) The turbine bypass equipment such as separator WS, valves BE, SA, WD and SP as well as the various conduits leading to the condenser such as conduits 26 and 29, can in accordance with the invention be dimensioned for a low through-flow such as 10% of maximum capacity requirement. This is in sharp contrast to the large sized apparatus required for a conventional startup operation where a minimum of 30% through-flow is essential;

(3) Aside from the improved plant economy achieved by the substantial reduction in capital outlay for startup equipment, additional savings in heat output are realized because of the substantially reduced working fluid quantity that must be heated during startup operation, i.e., a heat reduction from 30% to 10%;

(4) The economy of the startup procedure in accordance with the invention is further improved by the shortening of the startup time, since only a fluid quantity of 10% of the maximum capacity requirement must be heated and brought up to pressure before the turbine is synchronized; and (5) The relatively small through-flow quantity of 10% being characteristic of the herein disclosed startup method permits the most desirable raising of the temperature of the steam to a considerably higher degree than the conventional 550° F., preferably to as much as 800° F. without endangering the heating surfaces of reheater RH which at this time is not being cooled by steam.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

1. In a method of starting a once-through flow vapor generator including a turbine and having fuel burning means for heating a working fluid, a vapor generating portion comprising fluid carrying tubes, a vapor heating portion, valve means separating said vapor heating portion from said vapor generating portion, means for bypassing said valve means, and throttling means and a separator contained in said bypass means, said separator being located downstream of said throttling means, the steps comprising, (1) passing a predetermined quantity of working fluid at a given flow rate and relatively high pressure through said fluid carrying tubes to produce a velocity therein sufficient for protecting said tubes against overheating;

(2) taking at said high pressure a major part from said quantity and recirculating said major part around said vapor generating portion by returning said major part from a point directly downstream of said generating portion and upstream of said throttling means and separator to a point upstream of said vapor generating portion, while maintaining said recirculated major part substantially within the pressure and temperature range of said vapor generating portion;

(3) producing from the remaining minor part of said quantity flashed vapor by expanding said minor part through said throttle means to a region of lower pressure;

(4) superheating said flashed vapor by passing it through said vapor heating portion; and (5) passing said superheated flashed vapor to said turbine for warming up, rolling and synchronizing the same.

2. In a forced once-through flow vapor generating power plant having heat input means, a vapor generating section, a vapor heating section, first throttle and shutoff means for throttling and shutting off flow between said vapor generating section and said vapor heating section, second throttle and shutoff means, and a separator for separating the vapor from the liquid, said second throttling and shutoff means and separator being in parallel and bypass flow relation with said first throttle and shutoff means and being serially connected in the order named, and a turbine arranged to be driven by said generated vapor, the method of starting said vapor generator comprising the steps of:

(1) passing heated working fluid at normal operating pressure through said vapor generating section with said first throttle and shutoff means closed;

(2) recirculating a major portion of said working fluid around said vapor generating section by returning said major portion directly to said vapor generating section from a point directly downstream of said section and upstream of said second throttle and shutoff means and said separator to a point upstream of said vapor generating section, while maintaining said recirculating major portion substantially within the pressure and temperature range of said vapor generating section;

(3) expanding the remaining minor portion of said working fluid from said operating pressure to a substantially lower pressure for producing a mixture of vapor and liquid by passing said minor portion through said second throttling and shutoff means, said minor heated portion requiring a heat input less than that which would destructively overheat said vapor heating section;

(4) separating the vapor and liquid in said mixture;

(5) passing said separated vapor through said superheating section into said turbine for warming up, rolling and synchronizing said turbine;

(6) removing said separated liquid together with the impurities contained therein until the concentration of impurities in said working fluid reaches an acceptable value; and (7) gradually transferring the flow of working fluid and the expanding thereof from said second throttling and shutoff means to said first throttling and shutoff means until said first throttling and shutoff means is entirely open and said second throttling and shutoff means is entirely closed; thereby commencing normal operation of the vapor generating power plant.

3. In a forced once-through flow vapor generating power plant having a vapor generating section, a vapor heating section, first throttle and shutoff means for throttling and shutting off flow between said vapor generating section and said vapor heating section, second throttle and shutoff means, and a separator for separating the vapor from the liquid, said second throttling and shutoff means and separator being in parallel and bypass flow relation with said first throttle and shutoff means and being serially connected in the order named, and a turbine arranged to be driven by said generated vapor, the method of starting said vapor generator comprising the steps of:

(1) passing heated working fluid at normal operating pressure through said vapor generating section with said first throttle and shutoff means closed;

(2) recirculating a major portion of said working fluid around said vapor generating section by returning said major portion directly to said vapor generating section from a point directly downstream of said section and upstream of said second throttle and shutoff means and said separator to a point upstream of said vapor generating section, while maintaining said recirculating major portion substantially within the pressure and temperature range of said vapor generating section;

(3) expanding the remaining minor portion of said working fluid from said operating pressure to a substantially lower pressure for producing a mixture of vapor and liquid by passing said minor portion through said second throttling and shutoff means, said minor portion of working fluid constituting a flow rate substantially less than 30 percent of the flow rate mentioned at maximum capacity of said vapor generating power plant;

(4) separating the vapor and liquid in said mixture;

(5) passing said separated vapor through said superheating section into said turbine for warming up, rolling and synchronizing said turbine;

(6) removing said separated liquid together with the impurities contained therein until the concentration of impurities in said working fluid reaches an acceptable value; and (7) gradually transferring the flow of working fluid and the expanding thereof from said second throttling and shutoff means to said first throttling and shutoff means with said first throttling and shutoff means being opened until said second throttling and shutoff means is entirely closed.

References Cited by the Examiner

UNITED STATES PATENTS

| 2,989,038 | 6/61 | Schwarz | 122—406 |
| 3,019,774 | 2/62 | Beyerlein | 122—406 |
| 3,038,453 | 6/62 | Arnacost | 122—406 |

FOREIGN PATENTS 768,201  2/57  Great Britain.

OTHER REFERENCES

Strohmeyer: Large Sub and Supercritical Steam Generator Startup and Control System Integration With the Turbine Generator, reprint of paper presented at the American Power Conference, March 1962 (18 pp. text plus 9 pp. dwg.) pp. 6–10 of text and Figs. 7–9 of dwgs. in particular.

Mitteilungen Number 1, September 1956, published by Dorrwerke-Aktiengesellschaft, Ratingen, Germany (pp. 6–8 relied on).

FREDERICK L. MATTESON, JR., *Primary Examiner.*

MEYER PERLIN, ROBERT A. O'LEARY, PERCY L. PATRICK, *Examiners.*